(12) United States Patent
Oikaze et al.

(10) Patent No.: US 9,977,229 B2
(45) Date of Patent: May 22, 2018

(54) INNER LAYER MEASUREMENT METHOD AND INNER LAYER MEASUREMENT DEVICE

(71) Applicant: Panasonic Intellectual Property Management Co., Ltd., Osaka (JP)

(72) Inventors: Hirotoshi Oikaze, Shiga (JP); Yasuhiro Kabetani, Osaka (JP); Yohei Takechi, Osaka (JP); Tomotaka Furuta, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 318 days.

(21) Appl. No.: 14/859,208

(22) Filed: Sep. 18, 2015

(65) Prior Publication Data

US 2016/0097921 A1  Apr. 7, 2016

(30) Foreign Application Priority Data

Oct. 1, 2014 (JP) .................................. 2014-202747

(51) Int. Cl.
 *G02B 21/00* (2006.01)
 *G01B 9/02* (2006.01)
 (Continued)

(52) U.S. Cl.
 CPC ....... *G02B 21/002* (2013.01); *G01B 9/02002* (2013.01); *G01B 9/02007* (2013.01);
 (Continued)

(58) Field of Classification Search
 CPC .............. G02B 21/0016; G02B 21/002; G02B 21/0056; G02B 21/0064; G02B 21/0072;
 (Continued)

(56) References Cited

U.S. PATENT DOCUMENTS 5,341,205 A * 8/1994 McLandrich ...... G01B 11/0675
                                                        356/479
5,975,697 A    11/1999 Podoleanu et al.
(Continued)

FOREIGN PATENT DOCUMENTS

| JP | 2004-528586 | 9/2004 |
|---|---|---|
| JP | 2007-212376 | 8/2007 |
| WO | 2012/004388 | 1/2012 |

OTHER PUBLICATIONS

The European Search Report dated Feb. 23, 2016 for the related European Patent Application No. 15187028.4.
(Continued)

*Primary Examiner* — Stephone B Allen
*Assistant Examiner* — James McGee
(74) *Attorney, Agent, or Firm* — Panasonic IP Management (57) ABSTRACT

In an inner layer measurement method, first irradiation light and second irradiation light having a peak wavelength longer than that of the first irradiation light are formed by changing at least one of a position where light emitted from a lamp is transmitted through a short pass filter and a position where light emitted from a lamp is transmitted through a long pass filter. Then, a first XY sectional surface of a semitransparent body is measured by irradiating the first XY sectional surface with the first irradiation light. A second XY sectional surface positioned on a layer deeper than the first XY sectional surface is measured by irradiating the second XY sectional surface with the second irradiation light. Each of the short pass filter and the long pass filter can transmit the light and has properties of changing a cutoff wavelength according to the position where the light is transmitted.

13 Claims, 10 Drawing Sheets (51) Int. Cl.
  *G01B 9/04* (2006.01)
  *G02B 26/00* (2006.01)
  *G02B 21/26* (2006.01)
  *G02B 21/14* (2006.01)

(52) U.S. Cl.
  CPC ....... *G01B 9/0209* (2013.01); *G01B 9/02009* (2013.01); *G01B 9/02057* (2013.01); *G01B 9/04* (2013.01); *G02B 21/0016* (2013.01); *G02B 21/26* (2013.01); *G02B 26/007* (2013.01); *G01B 9/02048* (2013.01); *G02B 21/14* (2013.01)

(58) Field of Classification Search
  CPC ...... G02B 21/14; G02B 21/26; G02B 26/007; G01B 9/02–9/02002; G01B 9/02004–9/02009; G01B 9/02012; G01B 9/02015; G01B 9/0203; G01B 9/02042; G01B 9/02048; G01B 9/02057; G01B 9/0209; G01B 9/04; G01B 11/0675; G01B 11/2441
  USPC ........ 359/350, 351, 353, 359–360, 370–371, 359/577–579, 580, 583, 586, 588, 589, 359/629, 634, 637, 638, 839; 356/496–504, 511–514, 516
  See application file for complete search history.

(56) References Cited

U.S. PATENT DOCUMENTS

| | | |
|---|---|---|
| 6,166,804 A | 12/2000 | Potyrailo et al. |
| 2004/0061867 A1 | 4/2004 | Dubois et al. |
| 2011/0310395 A1 | 12/2011 | Tsai et al. |
| 2012/0200859 A1* | 8/2012 | Breitenstein ........... A61B 3/102 356/479 |
| 2013/0329270 A1 | 12/2013 | Nielsen et al. |

OTHER PUBLICATIONS

Communication pursuant to Article 94(3) EPC dated Mar. 11, 2016 for the related European Patent Application No. 15187028.4.

* cited by examiner

*WD: DISTANCE BETWEEN OBJECTIVE LENS AND DISH SURFACE

INNER LAYER MEASUREMENT METHOD AND INNER LAYER MEASUREMENT DEVICE

BACKGROUND

1. Technical Field

The present disclosure relates to an inner layer measurement method and an inner layer measurement device.

2. Description of the Related Art

In the related art, a phase modulation type interference microscope used for observing a semitransparent body in which light is reflected on a surface and an inner layer has been known. Among white interferometers, the interference microscope applies a phase modulation of the degree of a wavelength of light to a difference in an optical path length between measurement light and reference light, and thus measures an XY sectional surface of a target in a direction perpendicular to the optical axis. Published Japanese Translation No. 2004-528586 of the PCT International Publication discloses an inner layer measurement device of a semitransparent body using a Linnik interferometer.

SUMMARY

The present disclosure provides an inner layer measurement method and an inner layer measurement device in which spatial resolution is higher than that of the related art.

An inner layer measurement method of the present disclosure is a method of measuring XY sectional surfaces of a semitransparent body in which light is reflected on a surface and an inner layer thereof. First, light having both wavelength bands of first irradiation light and second irradiation light having a peak wavelength longer than that of the first irradiation light is emitted. Then, the first irradiation light and the second irradiation light are formed by changing at least one of a position at which this light is transmitted through a short pass filter and a position at which this light is transmitted through a long pass filter. Then, a first XY sectional surface of the semitransparent body is measured by irradiating the first XY sectional surface with the first irradiation light, and a second XY sectional surface positioned on a layer deeper than the first XY sectional surface is measured by irradiating the second XY sectional surface with the second irradiation light. Each of the short pass filter and the long pass filter is capable of transmitting the light and has properties of changing a cutoff wavelength in response to the position at which the light is transmitted.

An inner layer measurement device of the present disclosure measures XY sectional surfaces of a semitransparent body in which light is reflected on a surface and an inner layer. This inner layer measurement device includes a light interferometer, a driving mechanism, and a controller configured to controlling the driving mechanism. The light interferometer includes a lamp, a short pass filter, and a long pass filter. The lamp is configured to emit light having both wavelength bands of first irradiation light for measuring a first XY sectional surface of the semitransparent body and second irradiation light for measuring a second XY sectional surface positioned on a layer deeper than the first XY sectional surface. The second irradiation light has a peak wavelength longer than that of the first irradiation light. Each of the short pass filter and the long pass filter is capable of transmitting the light from the lamp and has properties of changing a cutoff wavelength according to a position at which the light is transmitted. The driving mechanism is configured to changing at least one of the position at which the light from the lamp is transmitted through the short pass filter and the position at which the light from the lamp is transmitted through the long pass filter so as to form the first irradiation light and the second irradiation light.

As described above, according to the present disclosure, it is possible to provide an inner layer measurement method and an inner layer measurement device in which spatial resolution is higher than that of the related art.

DETAILED DESCRIPTION OF THE PREFERRED EMBODIMENT

Problems of an inner layer measurement device of the related art will be briefly described before describing an embodiment of the present disclosure. Light of a near infrared wavelength which is used in the inner layer measurement device of the related art has a longer wavelength than that of visible light. For this reason, the light is considerably affected by diffraction. That is, when an inner layer is measured by using only a near infrared wavelength, spatial resolution at the time of performing the measurement decreases.

Hereinafter, an inner layer measurement method and an inner layer measurement device according to the embodiment of the present disclosure will be described with reference to the drawings.

Figure 1:
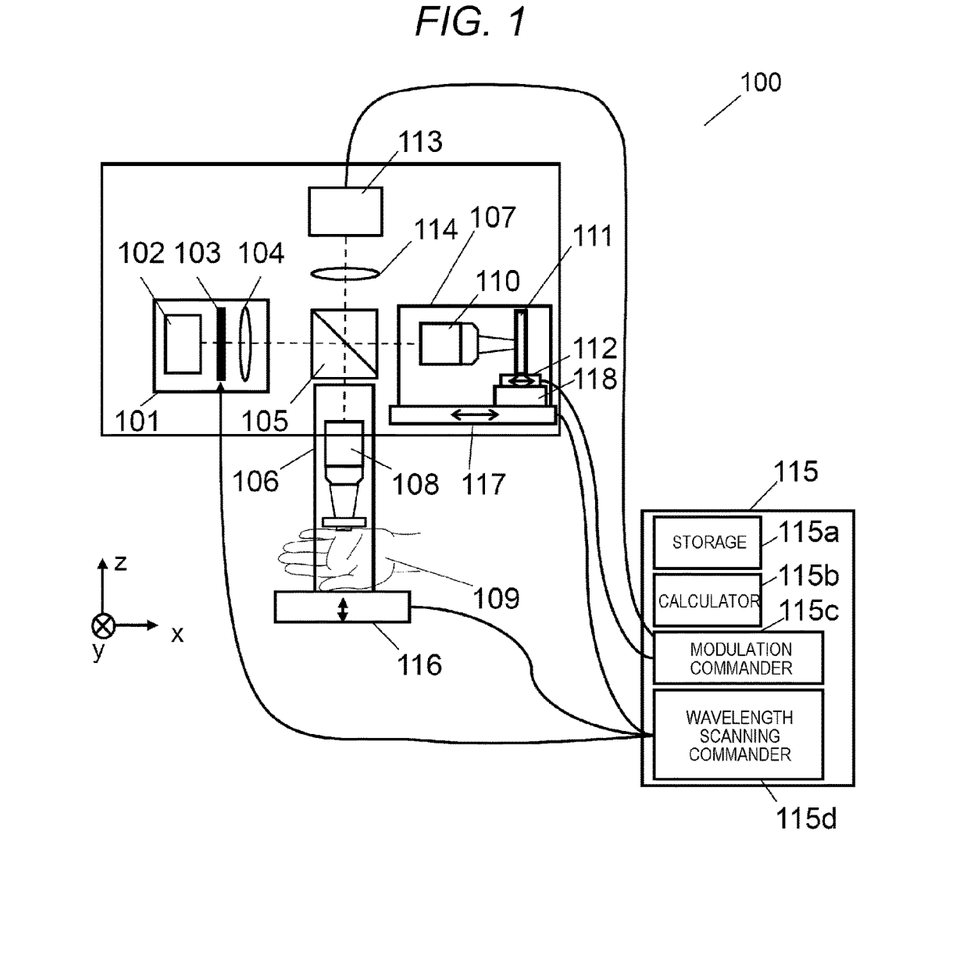
FIG. 1 is a schematic view of an inner layer measurement device according to an embodiment of the present disclosure.

FIG. 1 is a schematic view of inner layer measurement device 100 according to the present embodiment. Inner layer measurement device 100 is one of a Linnik type light interferometer. More specifically, inner layer measurement device 100 is one of a phase modulation type interference microscope.

Light source unit 101 emitting light includes lamp 102, wavelength scanning mechanism 103, and collimating lens 104. Lamp 102 is a light source emitting white light including near infrared light, for example, a halogen lamp or a xenon arc lamp, a mercury lamp, and the like.

The light emitted from light source unit 101 enters beam splitter 105. Beam splitter 105 may be a cube type one, or may be a plate type one. The light incident on beam splitter 105 is divided into measurement light and reference light having the same amplitude as each other. The measurement light is transmitted to first arm 106, and the reference light is transmitted to second arm 107.

First arm 106 is provided with first objective lens 108 and semitransparent body 109. A focal plane of the incident measurement light is set in semitransparent body 109 by first objective lens 108. The measurement light causing Fresnel reflection and back scattering in this focal plane returns to beam splitter 105 through first objective lens 108. Semitransparent body 109 reflects the incident light on a surface and an inner layer. Examples of the semitransparent body include a body tissue such as a skin cell, a resin or metal coated with a film, an industrial product such as glass or a semiconductor product.

Second arm 107 is provided with second objective lens 110 and reference surface 111. The reference light is focused on reference surface 111 by second objective lens 110. The reference light reflected on reference surface 111 returns to beam splitter 105. The position of reference surface 111 is displaced by piezo stage 112 connected thereto.

When an optical path length of first arm 106 and an optical path length of second arm 107 are coincident with each other within a range of coherence length Lc of light source unit 101 (lamp 102 and an interference filter), the measurement light and the reference light which have returned to beam splitter 105 cause light interference. This interference light forms an image on camera 113 by imaging lens 114 focusing thereon.

Camera 113 includes a sensor including a CCD type two-dimensional pixel, for example, and a sensor surface and semitransparent body 109 are in an optically conjugated relationship as well as the sensor surface and reference surface 111 are. That is, camera 113 sets semitransparent body 109 and reference surface 111 in a viewing field thereof in an overlapping manner. In order to reduce measurement error due to optical-system aberration, it is preferable that optical magnifications at the time of being in the conjugated relationship are the same. In addition, in order to reduce measurement error due to wavelength dispersion, it is more preferable that the magnifications are adjusted by using the same glass material.

Sample positioning mechanism 116 is a Z axis stage, and relatively moves semitransparent body 109 and a focusing position of the measurement light in a Z axis direction. When the measurement is performed, sample positioning mechanism 116 moves semitransparent body 109 repeatedly at a regular interval, and camera 113 acquires and accumulates XY cross-sectional images repeatedly at a regular depth interval, and thus three-dimensional data of semitransparent body 109 can be constructed.

Optical path length adjustment mechanism 117 is an X axis stage, and adjusts the position of second arm 107, and thus adjusts an optical path length of the reference light.

Reference surface inclination device 118 is a gonio-stage, and inclines reference surface 111. The detail of reference surface inclination device 118 will be described below. When semitransparent body 109 is measured, the amount of inclination is set to zero.

Wavelength scanning mechanism 103 includes an interference filter and a wavelength switching mechanism. The interference filter is a combination of a short pass filter and a long pass filter described below, or a band pass filter, and includes a mechanism transmitting only light in a specific wavelength band from the light emitted from lamp 102.

Computer 115 includes storage 115a, calculator 115b, modulation commander 115c, and wavelength scanning commander 115d. Storage 115a stores the data acquired by camera 113. Calculator 115b calculates the XY cross-sectional image of semitransparent body 109. Modulation commander 115c controls a shutter of camera 113 and piezo stage 112. Wavelength scanning commander 115d controls wavelength scanning mechanism 103, sample positioning mechanism 116, and optical path length adjustment mechanism 117. Storage 115a, calculator 115b, modulation commander 115c, and wavelength scanning commander 115d may be a processor disposed in a common circuit board, or may be separate devices.

Modulation commander 115c synchronizes the shutter of camera 113 and piezo stage 112. Reference surface 111 is driven by piezo stage 112, and modulates a phase difference between the measurement light and the reference light.

In this embodiment, when an inner layer (a first XY sectional surface) in the vicinity of a surface layer of semitransparent body 109 and an inner layer (a second XY sectional surface) at a position deeper than that of the first XY sectional surface are observed, a wavelength of light to be emitted is scanned. Accordingly, spatial resolution can be improved.

Here, a principle of improving the spatial resolution by using wavelength scanning will be described. In the white interferometer, Z resolution increases as a wavelength bandwidth of light to be emitted becomes broader, and XYZ resolution increases as a peak wavelength becomes shorter. Therefore, the wavelength bandwidth is broadened by using a wavelength in a visible light band and the peak wavelength is made shorter, and thus it is possible to increase the XYZ resolution particularly at the time of measuring the inner layer (the first XY sectional surface) in the vicinity of the surface. In addition, when the deeper inner layer (the second XY sectional surface) is measured, as with the related art, near infrared light is emitted. Thus, in this embodiment, light of a suitable wavelength is emitted according to the depth, and thus it is possible to improve the spatial resolution compared to the related art. Hereinafter, the light rays used at the time of measuring the first XY sectional surface and the second XY sectional surface are respectively referred to as first irradiation light and second irradiation light. As described above, the second irradiation light has a peak wavelength longer than that of the first irradiation light.

Such wavelength scanning is realized by wavelength scanning mechanism 103 in response to the control of wavelength scanning commander 115d.

Meanwhile, the visible light includes light in a wavelength band of greater than or equal to 360 nm and less than 700 nm. The near infrared light includes light (or an electromagnetic wave) in a wavelength band of greater than or equal to 700 nm and less than or equal to 2.6 μm.

Figure 2:
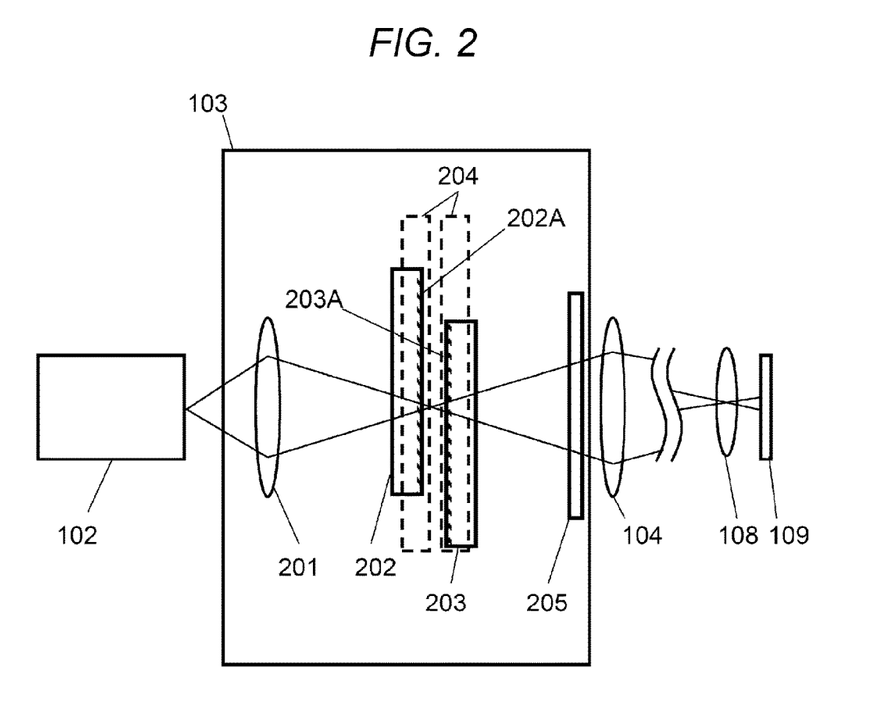
FIG. 2 is a schematic view of a wavelength scanning mechanism according to the embodiment of the present disclosure.

Here, wavelength scanning mechanism 103 will be described with reference to FIG. 2. FIG. 2 is a schematic view of wavelength scanning mechanism 103. Wavelength scanning mechanism 103 includes condenser lens 201, short pass filter (hereinafter, filter) 202, long pass filter (hereinafter, filter) 203, driving mechanism 204, and light intensity adjusting device 205. Arrangement positions of filters 202 and 203 and light intensity adjusting device 205 may be replaced.

A cutoff wavelength of filter 202 is changed in response to a position (a transmission position) at which the light is transmitted. Similarly a cutoff wavelength of filter 203 is changed in response to a position (a transmission position) at which the light is transmitted. For this reason, filters 202 and 203 are moved (the transmission positions are moved) by driving mechanism 204, and thus a wavelength bandwidth and a peak wavelength of the light to be transmitted (the irradiation light) can be independently changed. Meanwhile, driving mechanism 204 is an actuator, for example. That is, driving mechanism 204 changes the position at which the light from lamp 102 is transmitted through filter 202 and/or the position at which the light from lamp 102 is transmitted through filter 203. Accordingly, the first irradiation light and the second irradiation light are formed. In other words, lamp 102 emits light having both wavelength bands of the first irradiation light and the second irradiation light.

In addition, in order to prevent color unevenness, it is preferable that a distance between dielectric body surfaces 202A and 203A of filters 202 and 203 is set to be small. Specifically, it is preferable that filters 202 and 203 are disposed by allowing dielectric body surface 202A to face dielectric body surface 203A.

Instead of filters 202 and 203, the wavelength scanning also can be realized by a mechanism of switching a plurality of band pass filters or a diffraction grating, and a variable slit mechanism. However, in the former, the wavelength scanning is discontinuously performed. In the latter, light intensity loss increases. For this reason, it is preferable that wavelength scanning mechanism 103 is formed of filters 202 and 203, and linear filters are used as filters 202 and 203.

Furthermore, when the wavelength of the irradiation light is scanned by moving the transmission positions of the light in filters 202 and 203, light intensity is changed. A reduction in the light intensity causes a decrease in S/N of the XY cross-sectional image. In order to prevent this problem, it is preferable that the light intensity is adjusted by light intensity adjusting device 205 such that a gradation of an image captured by camera 113 illustrated in FIG. 1 is in a certain range.

For example, light intensity adjusting device 205 is formed of a variable ND filter which is a dimming mechanism. When the peak wavelength is shifted to the long wavelength side by wavelength scanning, the light intensity decreases. Therefore, when light with a short wavelength is emitted, the transmittance of the variable ND filter is set to be low, and the transmittance of the variable ND filter increases as the wavelength of the irradiation light shifts to the long wavelength side. That is, the transmittance of the variable ND filter becomes greater at the time of measuring the second XY sectional surface than at the time of measuring the first XY sectional surface. Furthermore, light intensity adjusting device 205 may be embedded in lamp 102.

Driving mechanism 204 and light intensity adjusting device 205 are controlled by a program stored in computer 115 illustrated in FIG. 1. That is, computer 115 is a controller configured to controlling at least driving mechanism 204.

Figure 3:
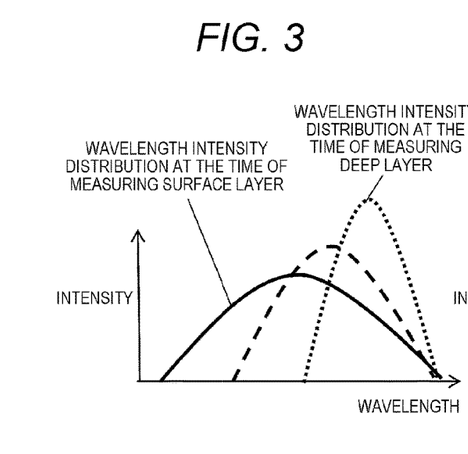
FIG. 3 is a wavelength intensity distribution chart for illustrating a wavelength scanning method having excellent Z resolution according to the embodiment of the present disclosure.

As a wavelength scanning method, one can be selected from a wavelength scanning method having high Z resolution and a wavelength scanning method having high XY resolution. In any method, the light (the second irradiation light) formed by eliminating the wavelength band shorter than that of the light (the first irradiation light) which is emitted at the time of measuring the sectional surface (the first XY sectional surface) in the vicinity of the surface is applied at the time of measuring the deeper sectional surface (the second XY sectional surface). Hereinafter, both wavelength scanning methods will be described with reference to FIG. 3 and FIG. 4. FIG. 3 is a wavelength intensity distribution chart for illustrating the wavelength scanning method having excellent Z resolution according to the embodiment of the present disclosure, and FIG. 4 is a wavelength intensity distribution chart for illustrating the wavelength scanning method having excellent XY resolution according to the embodiment of the present disclosure.

In the wavelength scanning method having high Z resolution, as illustrated in FIG. 3, both of a wavelength bandwidth and a peak wavelength width are scanned. In this method, the wavelength bandwidth of the light which is emitted at the time of measuring the vicinity of the surface is maximized. This wavelength scanning method is useful at the time of observing body tissue in which thin tissues spread flat are formed in a plurality of layers, such as a cornified layer or a cell sheet of the skin.

Figure 4:
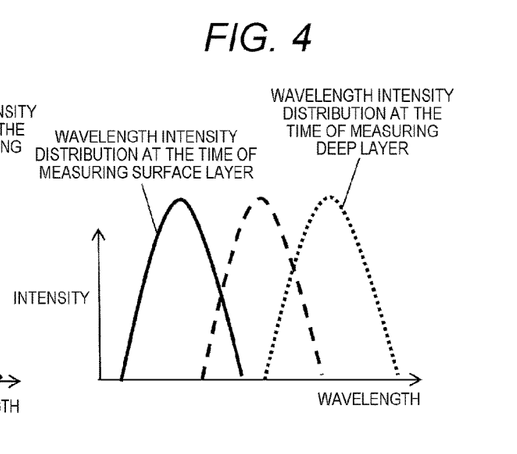
FIG. 4 is a wavelength intensity distribution chart for illustrating a wavelength scanning method having excellent XY resolution according to the embodiment of the present disclosure.

On the other hand, in the wavelength scanning method having high XY resolution, as illustrated in FIG. 4, only the peak wavelength is scanned while the wavelength bandwidth is fixed. In this method, the peak wavelength of the light which is emitted at the time of measuring the vicinity of the surface becomes the shortest wavelength. This wavelength scanning method is useful at the time of observing the microscopic structure of an industrial product, such as a pixel of CCD or a display which is formed with high density.

Meanwhile, in the wavelength scanning method having high Z resolution, the cutoff wavelength of filter 202 illustrated in FIG. 2 at the time of measuring the vicinity of the surface is fixed to be the longest wavelength which can be set. Then, only the position of filter 203 is scanned (changed) according to the depth of the inner layer which is desired to be measured. That is, the cutoff wavelength is shifted. For example, such a method can realize the wavelength scanning method having high Z resolution.

On the other hand, in the wavelength scanning method having a high XY resolution, filter 202 and filter 203 are scanned at the same speed according to the depth of the inner layer which is desired to be measured. That is, the entire wavelength is shifted while maintaining a difference between the cutoff wavelengths of filters 202 and 203 to be constant. For example, such a method can realize the wavelength scanning method having high XY resolution.

Figure 5:
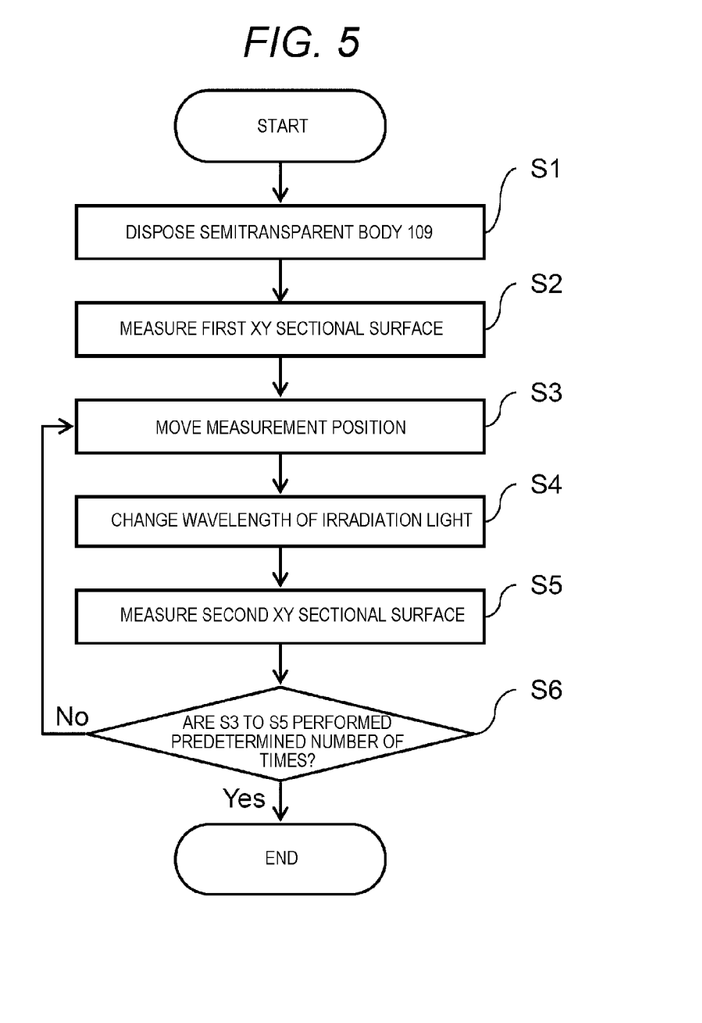
FIG. 5 is a flowchart illustrating an inner layer measurement method according to the embodiment of the present disclosure.

Next, an inner layer measurement method according to this embodiment will be described with reference to FIG. 5. FIG. 5 is a flowchart illustrating the inner layer measurement method according to this embodiment. Hereinafter, the inner layer measurement method will be described suitably with reference to FIG. 1.

In S1, semitransparent body 109 is disposed.

In S2, the first XY sectional surface of semitransparent body 109 is measured. Specifically, by using piezo stage 112 connected to reference surface 111, images are acquired by camera 113 while performing a phase modulation with respect to the optical path length. Then, the first XY cross-sectional image is constructed from the acquired images. The constructed first XY cross-sectional image is accumulated in storage 115*a*. Meanwhile, light emitted from light source unit 101 when the first XY sectional surface is measured is referred as the first irradiation light.

In S3, a measurement position is moved. Specifically, by driving sample positioning mechanism 116, the depth of the measurement position in semitransparent body 109 is changed. Here, a position (a deep layer) deeper than that of the first XY sectional surface is the measurement position.

In S4, the wavelength of the light to be emitted is changed. Specifically, the light is changed to the second irradiation light having a peak wavelength longer than that of the first irradiation light emitted in S2. This change is realized by wavelength scanning mechanism 103. The second irradiation light is formed by eliminating the wavelength band shorter than that of the first irradiation light by using filter 203.

In S5, the second XY sectional surface of semitransparent body 109 is measured. Specifically, by using piezo stage 112 connected to reference surface 111, images are acquired by camera 113 while performing a phase modulation with respect to the optical path length. Then, the second XY cross-sectional image is constructed from the acquired images. The constructed second XY cross-sectional image is accumulated in storage 115*a*. That is, according to this operation, the second XY sectional surface positioned on a layer deeper than the first XY sectional surface is measured. Meanwhile, light emitted from light source unit 101 when the second XY sectional surface is measured is referred as the second irradiation light.

In S6, it is determined whether or not S3 to S5 are performed a predetermined number of times. When the number of times of performing S3 to S5 does not reach the predetermined number of times, the process proceeds to S3, and when the number of times of performing S3 to S5 reaches the predetermined number of times, the measurement ends.

As described above, semitransparent body 109 is measured. When the vicinity of the surface layer is measured, the peak of the irradiation light is shifted to the short wavelength side, and when the inner layer at a deeper position is measured, the peak of the irradiation light is shifted to the long wavelength side, and thus it is possible to realize the measurement with higher resolution. Furthermore, these operations are performed by controlling each configuration of inner layer measurement device 100 by using computer 115.

As described above, inner layer measurement device 100 measures the XY sectional surface of semitransparent body 109 in which the light is reflected on the surface and the inner layer. Inner layer measurement device 100 includes the light interferometer, driving mechanism 204, and computer 115 which is the controller. The light interferometer includes lamp 102, short pass filter 202, and long pass filter 203. Lamp 102 emits the light having both wavelength bands of the first irradiation light for measuring the first XY sectional surface of semitransparent body 109 and the second irradiation light for measuring the second XY sectional surface positioned on a layer deeper than the first XY sectional surface. The second irradiation light has a peak wavelength longer than that of the first irradiation light. Each of filters 202 and 203 transmits the light from lamp 102 and has properties of changing the cutoff wavelength in response to the position at which the light is transmitted. Driving mechanism 204 changes the position at which the light from lamp 102 is transmitted through filter 202 and/or the position at which the light from lamp 102 is transmitted through filter 203, and thus forms the first irradiation light and the second irradiation light.

Meanwhile, in the above description, a case where the deep layer is measured after the vicinity of the surface layer is measured is described, but the sequence of measuring the inner layer may be reversed. That is, first, the second XY sectional surface may be measured before the first XY sectional surface is measured.

Next, a specific degree of improvement of the resolution will be described. For example, it is assumed that the wavelength band of the irradiation light of light source unit 101 illustrated in FIG. 1 is 400 nm to 2000 nm, the sensitivity wavelength band of camera 113 is 400 nm to 1000 nm, and the number of openings NA of first objective lens 108 is 0.8.

In this case, in order to perform the wavelength scanning method having high Z resolution, the cutoff wavelength of filter 202 of FIG. 2 is fixed to 1000 nm, and the cutoff wavelength of filter 203 is scanned between 400 nm and 700 nm. Thus, the peak wavelength of the irradiation light is scanned between 700 nm and 850 nm. In this case, the XY resolution is 0.53 µm at the time of measuring the vicinity of the surface, and is 0.65 µm at the time of measuring the deep layer. On the other hand, the Z resolution is 0.67 µm at the time of measuring the vicinity of the surface, and is 2.3 µm at the time of measuring the deep layer.

In addition, in order to perform the wavelength scanning method having high XY resolution, the cutoff wavelength of filter 202 is scanned between 600 nm and 1000 nm, and the cutoff wavelength of filter 203 is scanned between 400 nm and 800 nm. Then, filters 202 and 203 are moved at the same speed. Accordingly, the peak wavelength of the irradiation light is scanned up to 500 nm to 900 nm while constantly maintaining the difference the cutoff wavelengths of 200 nm. In this case, the XY resolution is 0.38 µm at the time of measuring the vicinity of the surface, and is 0.69 µm at the time of measuring the deep layer. On the other hand, the Z resolution is 1.2 µm at the time of measuring the vicinity of the surface, and is 4.0 µm at the time of measuring the deep layer.

In order to change the wavelength like in S4 of FIG. 5, the wavelength scanning table is used or the peak wavelength of the irradiation light is simply changed repeatedly at a regular interval. However, when the wavelength scanning table is used, it is possible to select the light wavelength suitable for the degree of scattering of semitransparent body 109, and thus the resolution increases. Therefore, using the wavelength scanning table is preferable.

A preparation procedure of the wavelength scanning table will be described. The wavelength scanning table is not prepared at the time of performing actual measurement, but is prepared in advance. Furthermore, in the wavelength scanning table, the measurement position (the depth) and the wavelength optimized for the measurement of the position are stored in association with each other.

First, semitransparent body 109 of FIG. 1 is irradiated with a single light ray having a narrower wavelength band than that of the first irradiation light. Next, the wavelength of the single light ray is scanned, and thus a peak of interference fringe intensity measured in the second XY sectional surface is measured. Then, the wavelength band to be eliminated is determined on the basis of the measured peak. Finally, the wavelength scanning table is prepared by associating the wavelength band to be eliminated with the position (the depth) of the second XY sectional surface. This wavelength scanning table is stored in storage 115a. Such a procedure is performed by controlling each configuration of inner layer measurement device 100 by using computer 115. Meanwhile, the single light ray is light having a wavelength bandwidth of less than or equal to 100 nm.

Figure 6:
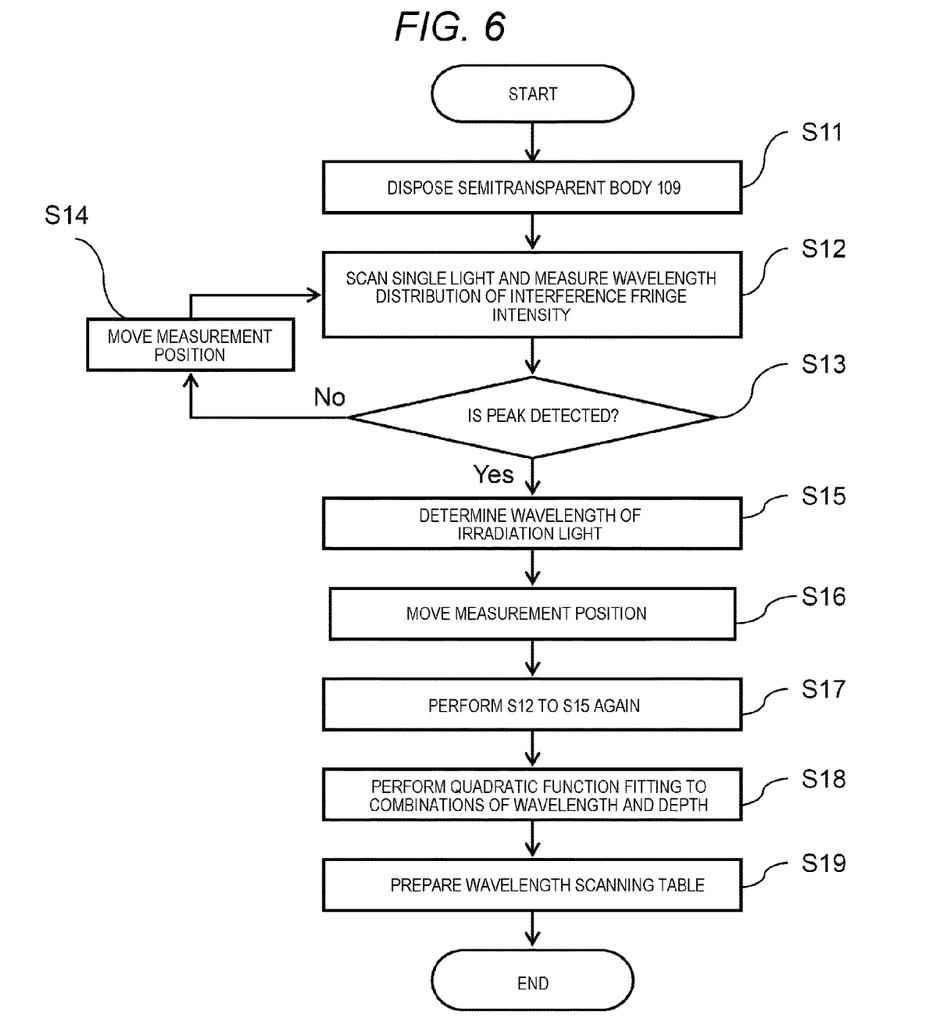
FIG. 6 is a flowchart illustrating a preparation method of a wavelength scanning table according to the embodiment of the present disclosure.

The detail of the above-mentioned preparing procedure of the wavelength scanning table will be described with reference to FIG. 6 and FIG. 1. FIG. 6 is a flowchart illustrating a preparation method of the wavelength scanning table according to the present embodiment.

In S11, semitransparent body 109 is disposed.

In S12, the single light ray is scanned, and a wavelength distribution of interference fringe intensity is measured. Specifically, the peak wavelength of the single light ray is scanned between 450 nm and 950 nm. During the scanning time, the wavelength distribution of the interference fringe intensity to be generated is measured.

In S13, it is determined whether or not the peak is detected from the wavelength distribution of the interference fringe intensity measured in S12. When the peak is not detected, S14 is performed, and when the peak is detected, S15 is performed.

In S14, the measurement position is moved in a deeper direction. Here, for example, the measurement position is moved to a position which is 50 μm deeper than the present measurement position.

In S15, from the wavelength distribution of the interference fringe intensity measured in S12, the wavelength of the irradiation light having interference fringe intensity of greater than or equal to 10% of the peak is determined.

In S16, the measurement position of semitransparent body 109 is moved to a deeper position than that at the time of ending S13.

In S17, S12 to S15 are performed again.

In S18, quadratic function fitting is performed to combinations of the wavelength of the irradiation light having interference fringe intensity of greater than or equal to 10% of the peak and the depth. By performing the quadratic function fitting, a continuous relationship between a measurement depth and the wavelength of the irradiation light can be derived from a discontinuous plot.

In S19, the wavelength scanning table in which the measurement depth is associated with the wavelength of the irradiation light is prepared from the quadratic function fitting performed in S18.

Figure 7:
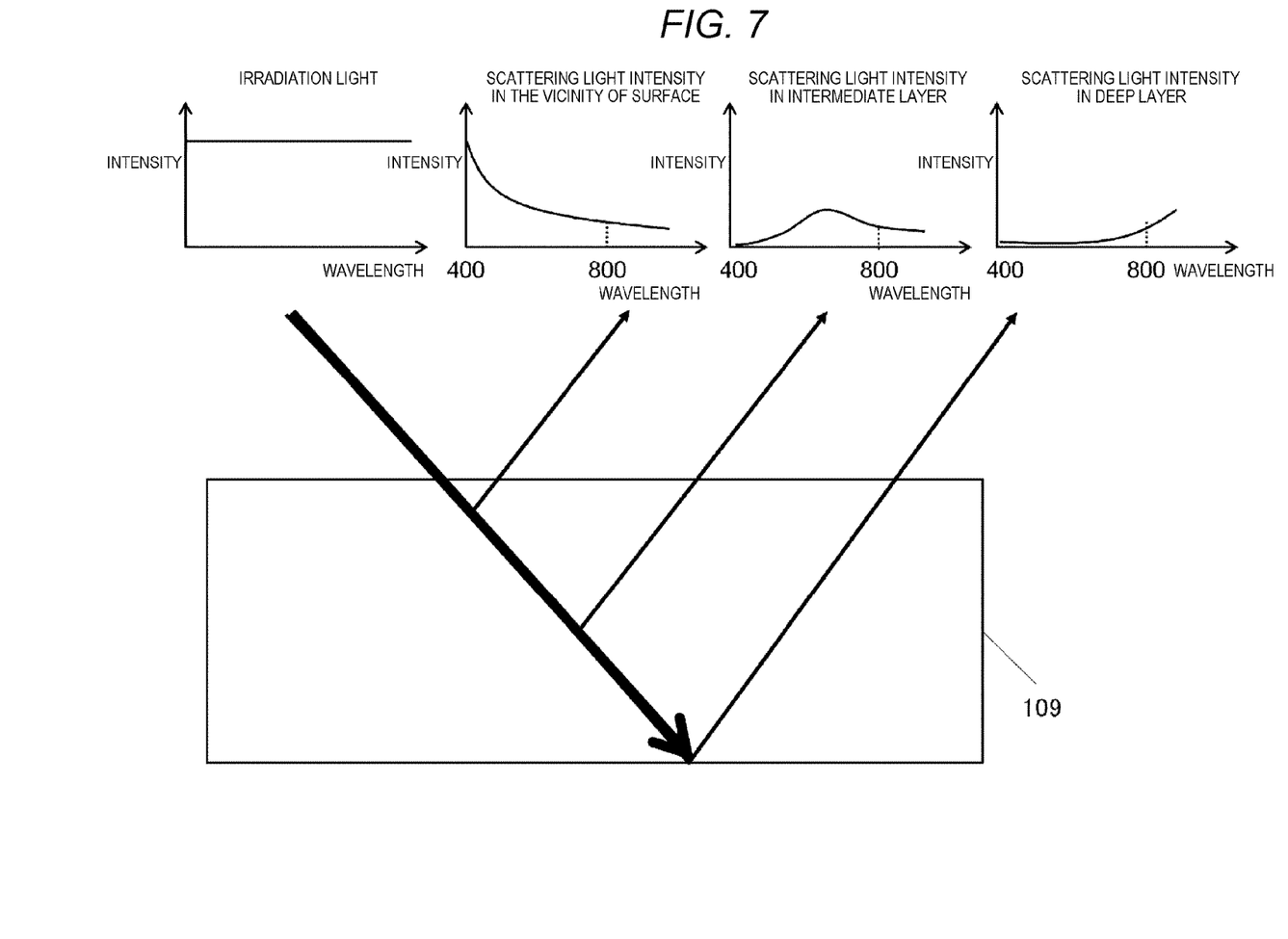
FIG. 7 is a schematic view illustrating wavelength dependency of a light scattering phenomenon in a semitransparent body.

Next, a specific example of the wavelength scanning table will be described with reference to FIG. 1 and FIG. 7. FIG. 7 is a schematic view illustrating wavelength dependency of a scattering phenomenon of the light in semitransparent body 109.

In S11 to S19, at a predetermined depth position from the surface of semitransparent body 109, it is determined which wavelength band of the light should be emitted in order to obtain the best resolution. The surface of semitransparent body 109 is irradiated with the light emitted from light source unit 101, and a part of the light penetrates through the inner layer. The light which penetrates through the inner layer is scattered. The degree of scattering of the light in the inner layer is inversely proportional to the square of the wavelength on the assumption of Mie scattering. For this reason, for example, light of 400 nm is scattered 4 times more strongly than light of 800 nm. However, the light is attenuated by the scattering, and thus the light of 800 nm reaches a layer which is 4 times deeper than that of the light of 400 nm.

For this reason, as illustrated in FIG. 7, a phenomenon occurs in which the light of 400 nm is strongly scattered in the vicinity of the surface, and the light of 800 nm is strongly scattered in a layer lower than or equal to an intermediate layer. Here, in all graphs of FIG. 7, a horizontal axis is a wavelength (nm), and a vertical axis is intensity of scattering light. When a graph having a peak of scattering light intensity in the intermediate layer as illustrated in FIG. 7 is obtained, it can be determined that light on the short wavelength side is evanescent due to the scattering, and light on the long wavelength side reaches a predetermined depth position.

Figure 8:
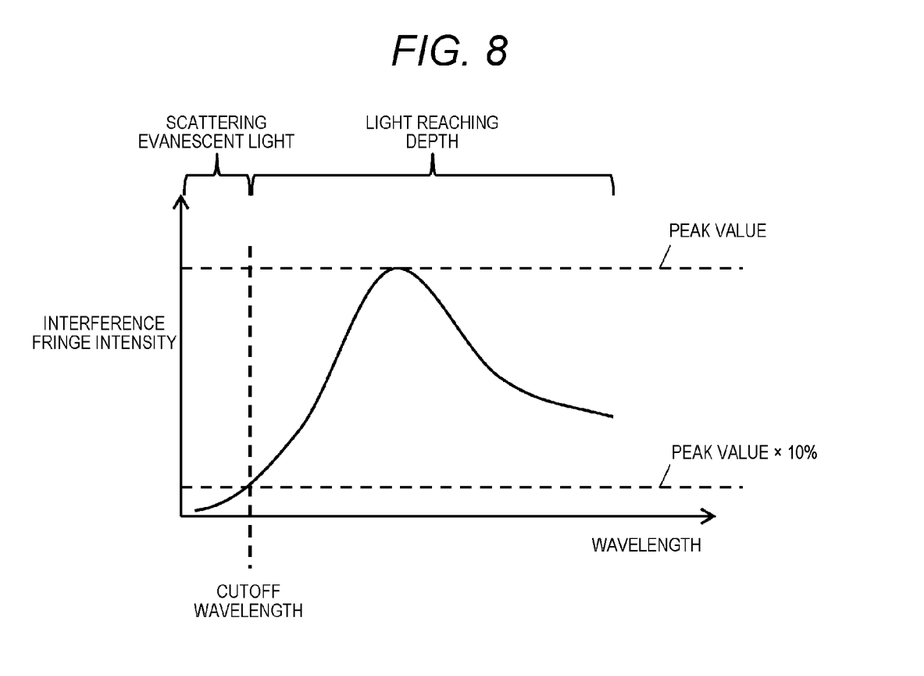
FIG. 8 is a diagram for illustrating a derivation method for a cutoff wavelength according to the embodiment of the present disclosure.
Figure 9:
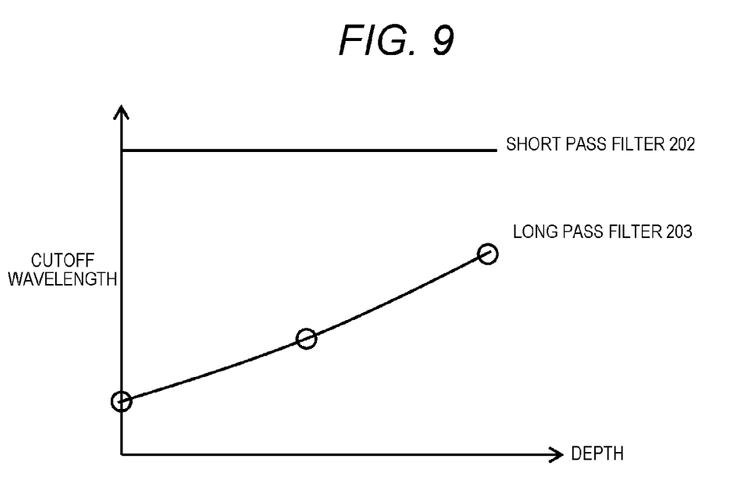
FIG. 9 is a diagram illustrating a cutoff wavelength of the wavelength scanning method having excellent Z resolution according to the embodiment of the present disclosure.
Figure 10:
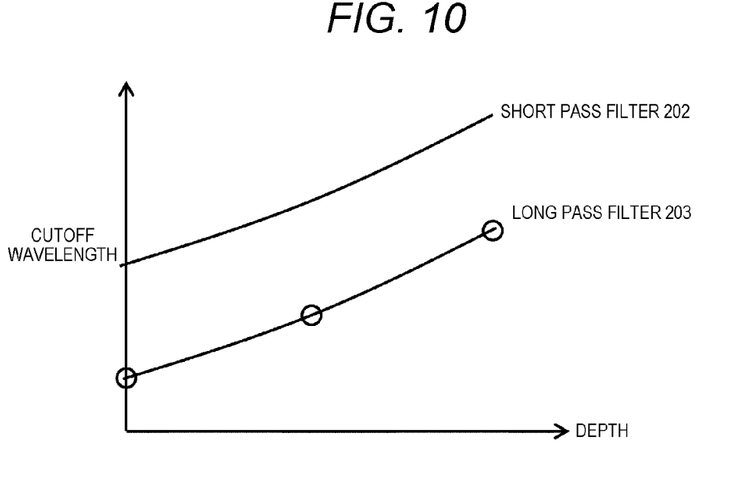
FIG. 10 is a diagram illustrating a cutoff wavelength of the wavelength scanning method having excellent XY resolution according to the embodiment of the present disclosure.

FIG. 8 is a diagram for illustrating a derivation method of the cutoff wavelength according to the present embodiment. FIG. 9 is a diagram illustrating the cutoff wavelength in the wavelength scanning method having excellent Z resolution according to the present embodiment. FIG. 10 is a diagram illustrating the cutoff wavelength in the wavelength scanning method having excellent XY resolution according to the present embodiment.

In the graph illustrated in FIG. 8, a vertical axis represents interference fringe intensity, and a horizontal axis represents wavelength. The wavelength of the irradiation light is adjusted by controlling the cutoff wavelength of the filter(s). Here, the cutoff wavelength of the long pass filter is determined to be greater than or equal to the peak value of interference fringe intensity×10%. However, this value may be suitably changed within a range of approximately 5% to 50%. It can be determined that all light rays having a wavelength longer than the cutoff wavelength reach the measurement position.

Then, the cutoff wavelength of long pass filter 203 is obtained at two points at which the measurement position of semitransparent body 109 is changed. The cutoff wavelength of filter 203 is set to the shortest wavelength in the vicinity of the surface. Then, as illustrated in FIG. 9, it is possible to plot white circles at three points. Here, in FIG. 9, a horizontal axis represents the depth of the measurement position from the surface of semitransparent body 109, and a vertical axis represents the cutoff wavelength. The quadratic function fitting is performed to this graph, and thus a curved line connecting white circles is obtained. Accordingly, a continuous relationship between the depth of the measurement position and the cutoff wavelength of filter 203 can be derived from discrete actual values of three points. Here, in the wavelength scanning method having high Z resolution, the cutoff wavelength of filter 202 is constantly set to the longest wavelength regardless of the depth of the measurement position.

On the other hand, in the wavelength scanning method having high XY resolution, the cutoff wavelength of filter 202 is set to maintain a constant difference with respect to the cutoff wavelength of filter 203 as illustrated in FIG. 10. In FIG. 10, a horizontal axis represents the depth of the measurement position from the surface of semitransparent body 109, and a vertical axis represents the cutoff wavelength. Here, a difference in the cutoff wavelengths of filters 202 and 203 corresponds to the wavelength bandwidth of the light to be emitted. As the Z resolution increases as the bandwidth becomes greater, the bandwidth may be greater than or equal to 200 nm, for example.

As described above, a relationship between the cutoff wavelength of each of filters 202 and 203 and the depth of the measurement position is prepared as the wavelength scanning table. Then, the wavelength scanning table is stored in storage 115a. It is possible to selectively emit light having a suitable wavelength band according to the measurement position with reference to the wavelength scanning table.

Furthermore, in S5 of FIG. 5, the optical path length of the reference light may be changed. Specifically, the optical path length of the reference light is changed at the time of emitting the first irradiation light in S2 and at the time of emitting the second irradiation light in S5. This operation is performed only when a medium in which semitransparent body 109 is clipped has a refractive index different from that of a medium disposed in the optical path of the reference light. According to this operation, it is possible to eliminate the influence of the shift generated in the optical path length, a deformation in the XY cross-sectional image is suppressed, and thus three-dimensional measurement is performed with higher accuracy.

As a case where a different medium is used, for example, a case is included in which the semitransparent body is a cell sheet, the cell sheet is dipped in a culture medium cultivating a cell, and pure water is disposed on the reference light side.

Figure 11:
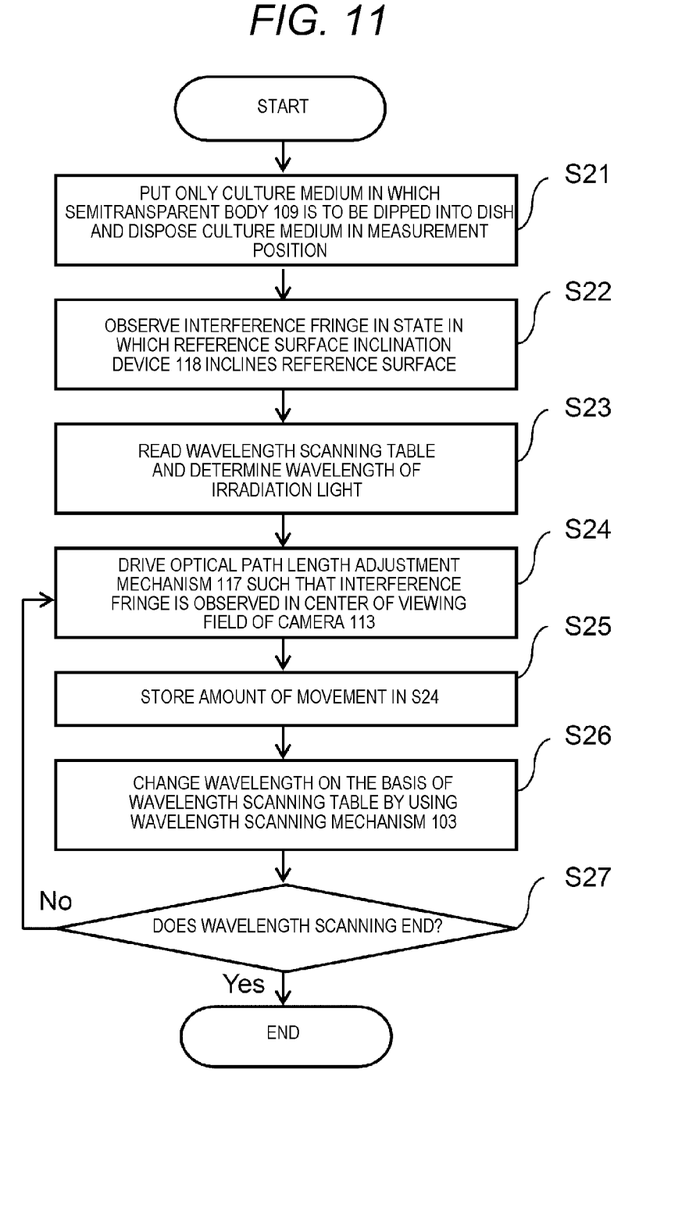
FIG. 11 is a flowchart illustrating a preparation method of an optical path length adjustment table according to the embodiment of the present disclosure.

When the optical path length of the reference light is changed, an optical path length adjustment table indicating the optical path length associated with the wavelength of the irradiation light is referred. A preparation method of this table will be described with reference to FIG. 1 and FIG. 11. FIG. 11 is a flowchart illustrating the preparation method of the optical path length adjustment table according to the present embodiment.

In S21, only the culture medium in which semitransparent body 109 is to be dipped is put into a dish and is disposed in the measurement position. Here, a bottom surface of the dish is formed of flat glass, for example.

In S22, an interference fringe is observed in a state where reference surface inclination device 118 inclines the reference surface. At this time, adjustment is performed such that the interference fringe is observed in the center of the viewing field of camera 113 by using optical path length adjustment mechanism 117.

In S23, the wavelength scanning table is read, and the wavelength of the irradiation light is determined.

In S24, optical path length adjustment mechanism 117 is driven such that the interference fringe is observed in the center of the viewing field of camera 113. Accordingly, the difference in the refractive index between the culture medium and the pure water is corrected.

In S25, an amount of movement in S24 is stored in storage 115a in association with the wavelength of the irradiation light as the optical path length adjustment table.

In S26, wavelength scanning mechanism 103 changes the wavelength on the basis of the wavelength scanning table.

In S27, it is determined whether or not wavelength scanning mechanism 103 ends the wavelength scanning. When the wavelength scanning does not end, the process returns to S24. When the wavelength scanning ends, the procedure is completed.

As described above, the optical path of the reference light is determined for each wavelength of the irradiation light, and the optical path of the reference light is stored in association with the wavelength of the irradiation light as the optical path length adjustment table.

Figure 12:
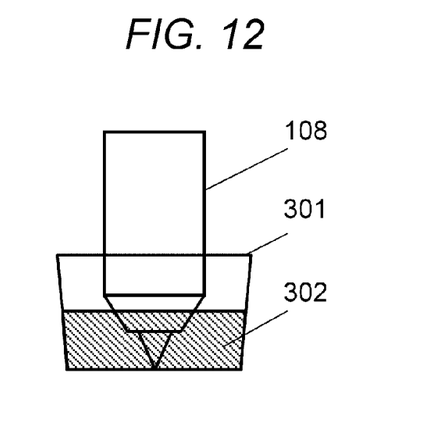
FIG. 12 is a schematic view illustrating a sample disposition state at the time of preparing the optical path length adjustment table according to the embodiment of the present disclosure.
Figure 13:
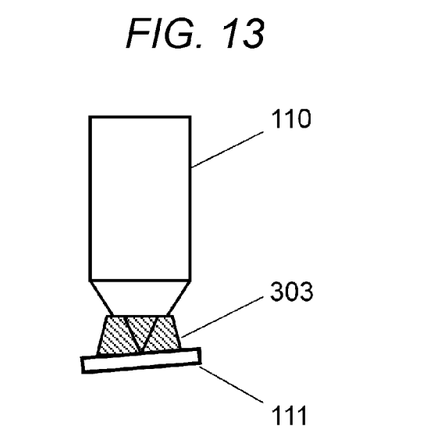
FIG. 13 is a schematic view illustrating a reference surface disposition state at the time of preparing the optical path length adjustment table according to the embodiment of the present disclosure.

FIG. 12 illustrates a state in which only culture medium 302 is put into dish 301. The bottom surface of dish 301 is positioned on the focal plane of first objective lens 108. FIG. 13 illustrates a state in which reference surface 111 is inclined. A space between reference surface 111 and second objective lens 110 is filled with pure water 303. Thus, when reference surface 111 is inclined, the optical path length of the measurement light can easily be coincident with the optical path length of the reference light. For example, reference surface 111 is inclined by 1 degree, and when the diameter of the viewing field is 1 mm, the maximum difference in the height within the viewing field is 17 μm. At this time, when a difference in the optical path length is within 17 μm is possible to observe the interference fringe within the viewing field.

Figure 14A:
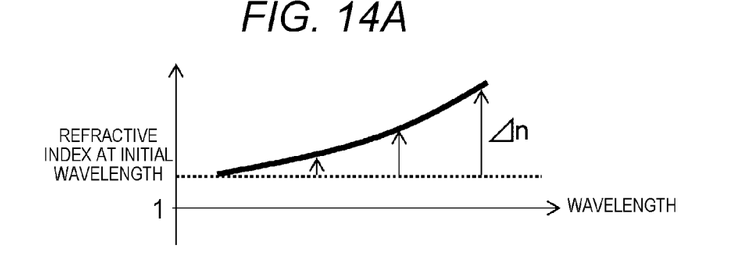
FIG. 14A is a graph illustrating a wavelength distribution of a relative refractive index of a culture medium with respect to pure water according to the embodiment of the present disclosure.
Figure 14B:
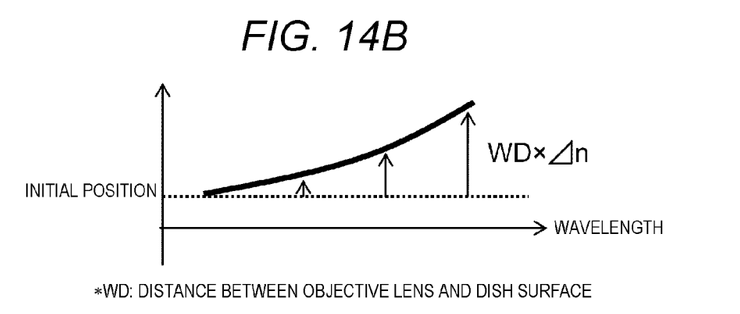
FIG. 14B is a graph illustrating an amount of displacement in an optical path length for correcting a shift in the optical path length based on the wavelength distribution of the relative refractive index of the culture medium with respect to the pure water according to the embodiment of the present disclosure.

FIG. 14A is a graph illustrating a relative refractive index of culture medium 302 with respect to pure water 303. A horizontal axis indicates a wavelength, and a vertical axis indicates a refractive index (a relative refractive index) at an initial wavelength. In the initial wavelength, the optical path lengths are coincident with each other. However, the relative refractive index is changed according to the wavelength scanning, and when $\Delta n$ is not 0, a shift in the optical path length is generated. FIG. 14B illustrates an amount of displacement in the optical path length for correcting such a shift in the optical path length. A horizontal axis indicates a wavelength, and a vertical axis indicates the amount of displacement. In this drawing, a positive value of the vertical axis indicates elongating the optical path length. The amount of displacement in the optical path length is indicated by "Distance WD between Objective Lens and Dish×Refractive Index Change $\Delta n$". In practice, the optical path length is changed such that the interference fringe is observed in the center of the viewing field.

The method described above is performed by a computer. More specifically, the method described above may be performed by one or more electronic circuits or processors including a semiconductor device, a semiconductor integrated circuit (IC), or LSI. In addition, the function or the operation thereof is performed by software processing. Such software may be stored not only in a storage element mounted on an electronic circuit, but also in a memory such as a non-temporal storing medium such as a ROM, an optical disc, or HDD.

Furthermore, among various exemplary embodiments or modification examples described above, arbitrary exemplary embodiments or modification examples can be suitably combined, and thus it is possible to obtain an effect of each of the exemplary embodiments or modification examples. In addition, a combination of the exemplary embodiments, a combination of the examples, or a combination of the exemplary embodiments and the examples is available, and a combination of the characteristics of different exemplary embodiments or examples is also available.

As described above, the present disclosure can be applied to measurement of an amount of moisture of the skin or structure analysis of the cell.

What is claimed is:

1. An inner layer measurement method of measuring XY sectional surfaces of a semitransparent body in which light is reflected on a surface and an inner layer thereof, the method comprising:

emitting light having both wavelength bands of first irradiation light and second irradiation light which has a peak wavelength longer than that of the first irradiation light;

forming the first irradiation light and the second irradiation light by transmitting the emitted light through a short pass filter and a long pass filter and changing at least one of a position at which the light is transmitted through a short pass filter and a position at which the light is transmitted through a long pass filter;

measuring a first XY sectional surface of the semitransparent body by irradiating the first XY sectional surface with the first irradiation light;

moving the measurement position of the semitransparent body in a Z axis direction to change a depth of the measurement position from the surface of the semitransparent body, and measuring a second XY sectional surface positioned on a layer deeper in the Z axis direction than the first XY sectional surface by irradiating the second XY sectional surface with the second irradiation light, wherein the short pass filter is capable of transmitting the light and has properties of changing a cutoff wavelength in response to the position at which the light is transmitted, the long pass filter is capable of transmitting the light and has properties of changing a cutoff wavelength in response to the position at which the light is transmitted, and the wavelength band of first irradiation light is determined according to a depth of the measurement position for the first XY sectional surface and the wavelength band of second irradiation light is determined according to a depth of the measurement position for the second XY sectional surface.

2. The inner layer measurement method according to claim 1,
wherein the second irradiation light is formed by eliminating a wavelength band shorter than that of the first irradiation light by using the long pass filter.

3. The inner layer measurement method according to claim 1, further comprising:
adjusting light intensities of the first irradiation light and the second irradiation light by changing intensity of the light.

4. The inner layer measurement method according to claim 1,
wherein the short pass filter and the long pass filter include dielectric body surfaces facing each other.

5. The inner layer measurement method according to claim 1,
wherein the semitransparent body is a body tissue, and the second irradiation light is formed by changing only a position of the long pass filter.

6. The inner layer measurement method according to claim 1,
wherein the second XY sectional surface is measured before the first XY sectional surface is measured.

7. The inner layer measurement method according to claim 1, further comprising:
preparing and storing a wavelength scanning table in advance, the wavelength scanning table containing a relationship between the cutoff wavelength of each of filters and the depth of the measurement position; and
determining the wavelength bands of first irradiation light and second irradiation light using the wavelength scanning table.

8. An inner layer measurement device measuring XY sectional surfaces of a semitransparent body in which light is reflected on a surface and an inner layer, the device comprising:
a light interferometer including
a lamp configured to emit light having both wavelength bands of first irradiation light for measuring a first XY sectional surface of the semitransparent body and second irradiation light for measuring a second XY sectional surface positioned on a layer deeper in a Z axis direction than the first XY sectional surface, the second irradiation light having a peak wavelength longer than that of the first irradiation light,
a short pass filter capable of transmitting the light from the lamp and having a cutoff wavelength which is changed in response to a position at which the light is transmitted, and
a long pass filter capable of transmitting the light from the lamp and having a cutoff wavelength which is changed in response to a position at which the light is transmitted;
a driving mechanism configured to changing at least one of the position at which the light from the lamp is transmitted through the short pass filter and the position at which the light from the lamp is transmitted through the long pass filter, the emitted light being transmitted through the short pass filter and the long pass filter, so as to form the first irradiation light and the second irradiation light,
a sample positioning mechanism configured to move the measurement position of the semitransparent body in the Z axis direction to change a depth of the measurement position from the surface of the semitransparent body, the wavelength band of first irradiation light being determined according to a depth of the measurement position for the first XY sectional surface and the wavelength band of second irradiation light being determined according to a depth of the measurement position for the second XY sectional surface; and
a controller configured to controlling the driving mechanism and the sample positioning mechanism.

9. The inner layer measurement device according to claim 8,
wherein the long pass filter forms the second irradiation light by eliminating a wavelength band shorter than that of the first irradiation light.

10. The inner layer measurement device according to claim 8,
wherein the light interferometer further includes a light intensity adjusting device configured to adjusting light intensities of the first irradiation light and the second irradiation light by changing intensity of the light from the lamp, and
the controller is configured to also controlling the light intensity adjusting machine.

11. The inner layer measurement device according to claim 8,
wherein the short pass filter and the long pass filter include dielectric body surfaces facing each other.

12. The inner layer measurement device according to claim 8,
wherein the driving mechanism forms the second irradiation light by changing only a position of the long pass filter.

13. The inner layer measurement device according to claim 8, further comprising:

a storage configured to store a wavelength scanning table containing a relationship between the cutoff wavelength of each of filters and the depth of the measurement position, the wavelength scanning table being used to determine the wavelength bands of first irradiation light and second irradiation light.

* * * * *